US006718288B1

(12) United States Patent
Wakeman

(10) Patent No.: US 6,718,288 B1
(45) Date of Patent: Apr. 6, 2004

(54) METHOD FOR GENERATING TRANSFER FUNCTIONS

(75) Inventor: Thomas George Wakeman, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/425,912

(22) Filed: Oct. 25, 1999

(51) Int. Cl.$^7$ .............................................. G06F 17/10

(52) U.S. Cl. .............................................. 703/2; 700/31

(58) Field of Search ................................ 703/2; 700/29, 700/40, 97, 31

(56) References Cited

U.S. PATENT DOCUMENTS

| | | | | |
|---|---|---|---|---|
| 5,347,446 A | * | 9/1994 | Iino et al. | 700/29 |
| 6,253,115 B1 | * | 6/2001 | Martin et al. | 700/97 |
| 6,360,131 B1 | * | 3/2002 | Cheng | 700/40 |
| 6,377,908 B1 | * | 4/2002 | Ostrowski et al. | 703/2 |

OTHER PUBLICATIONS

Furuta et al., K. Disturbance Attenuation Controller Design by Markov Parameters, Processings of the 34th IEEE Conference on Decision and Control, 1995, Dec. 1995, pp. 2962–2967.*

Howze et al., J.W. Robust Tracking, Error Feedback, and Two–Degree–of–Freedom Controllers, IEEE Transactions on Automatic Control, vol. 42, No. 7, Jul. 1997, pp. 980–983.*

Monopoli, R.V. Control of Linear Plants with Zeros and Slowly Varying Parameters, IEEE Transactions on Automatic Control, vol. 12, No. 1, Feb. 1967, pp. 80–83.*

Liu et al., L. Adaptive State Tracking, IEE Proceedings on Control Theory and Applications, vol. 135, No. 6, Nov. 1988, pp. 429–435.*

Mourey et al., M. A Phase Noise Model to Improve the Frequency Stability of Ultra Stable Oscillator, Proceedings of the 1997 IEEE International Frequency Control Symposium, May 1997, pp. 502–508.*

D. Robinson et al., Series Elastic Actuator Development for a Biomimetic Walking Robot, Proceedings of the 1999 IEEE/ASME InternationaL Conference on Advanced Intelligent Mechatronics, Sep. 1999, pp. 561–568.*

R.Jacquot et al., Generalized Gain Plots for Proportiional Digital Control for Second–Order All–Pole Plants, IEEE Control Systems Magazine, Jun. 2000, pp. 80–84.*

* cited by examiner

*Primary Examiner*—Russell Frejd
(74) *Attorney, Agent, or Firm*—Donald S. Ingraham; Christian G. Cabou

(57) ABSTRACT

An exemplary embodiment of the invention is directed to a method for determining a transfer function relating a critical to quality parameter to key parameters in a design for six sigma process. The method includes determining a dimensionless group containing a plurality of key parameters. The key parameters may include key control parameters or key noise parameters that have an affect on the critical to quality parameter. A transfer function relating the dimensionless group to the critical to quality parameter is then generated.

12 Claims, 1 Drawing Sheet

10 OBTAIN PARAMETERS
12 DETERMINE DIMENSIONLESS GROUPS
14 SELECT DIMENSIONLESS GROUPS
16 EXTRACT DIMENSIONLESS GROUPS FROM DIFFERENTIAL EQUATIONS IN CANONICAL FORM
18 GENERATE FUNCTIONAL TRANSFER FUNCTION
20 GENERATE ANALYTICAL TRANSFER FUNCTION

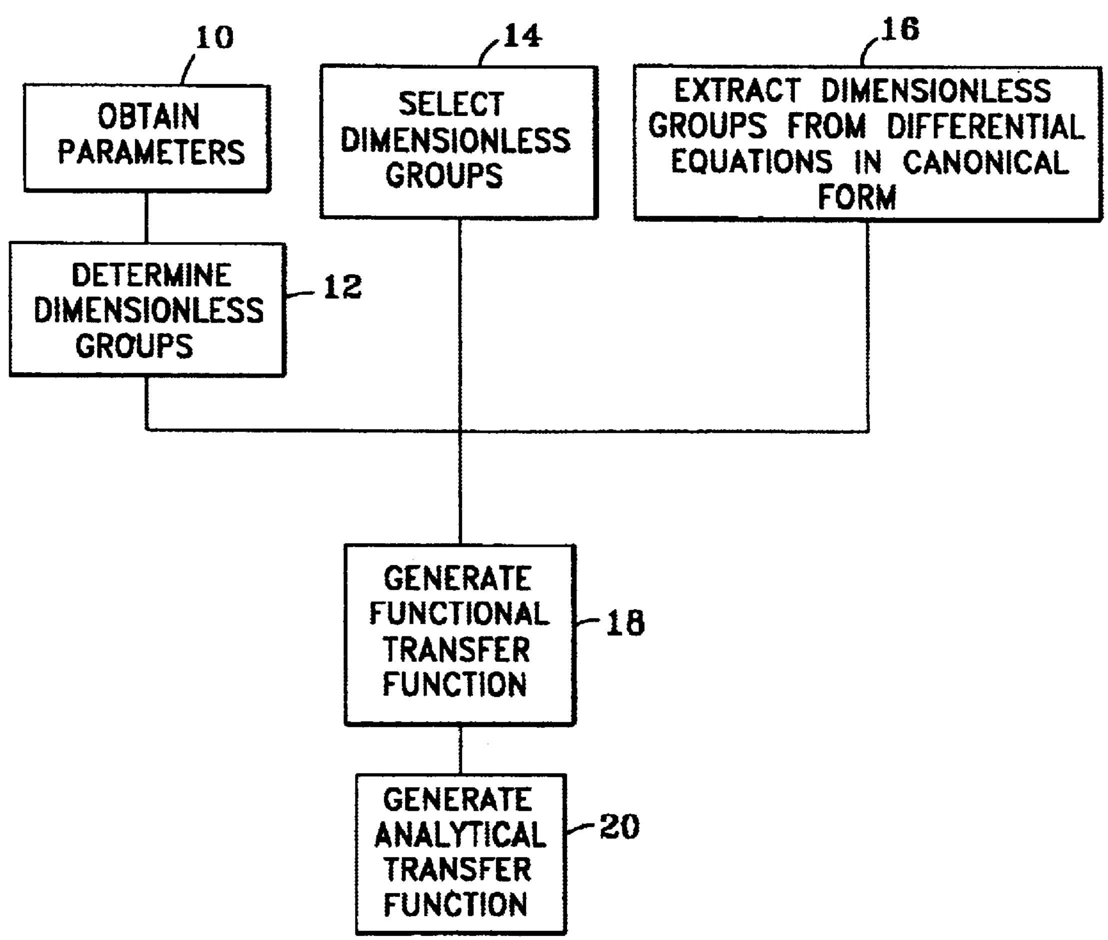
10
OBTAIN PARAMETERS
14
SELECT DIMENSIONLESS GROUPS
16
EXTRACT DIMENSIONLESS GROUPS FROM DIFFERENTIAL EQUATIONS IN CANONICAL FORM
DETERMINE DIMENSIONLESS GROUPS
12
GENERATE FUNCTIONAL TRANSFER FUNCTION
18
GENERATE ANALYTICAL TRANSFER FUNCTION
20

METHOD FOR GENERATING TRANSFER FUNCTIONS

BACKGROUND OF THE INVENTION

The invention relates to a method for generating semi-empirical transfer functions. An existing design process known as the design for six sigma (DFSS) process focuses on meeting critical to quality (CTQ) parameters by controlling one or more key control parameters (KCP's) and/or key noise parameters (KNP's). In the DFSS process, the transfer functions can be represented as $$Y=F(X_1, X_2, \ldots X); \text{ or}$$

$$CTQ=F(KCPs, KNPs).$$

The transfer functions may be developed using closed form analyses, numerical analyses, or experimentation. The numerical and experimental methods often use regression analysis and design of experiments. Closed form solutions are generally available for only relatively simple problems. These transfer functions are typically obtained in the DFSS process by brainstorming the relevant parameters and using regression analysis and design of experiments (DOE) to fit these parameters to the numerical analysis or experimental data. The resulting transfer functions are usually in a polynomial form. A drawback to this process is that polynomial transfer functions require relatively large DOE's since the known physical relationships are not used. These resulting equations are cumbersome and provide little insight into physical relationships among the equation parameters.

BRIEF SUMMARY OF THE INVENTION

An exemplary embodiment of the invention is directed to a method for determining a transfer function relating a critical to quality parameter to key parameters in a design for six sigma process. The method includes determining a dimensionless group containing a plurality of key parameters. The key parameters include key control parameters or key noise parameters that have an affect on the critical to quality parameter. A transfer function relating the dimensionless group to the critical to quality parameter is then generated.

BRIEF DESCRIPTION OF THE DRAWINGS

The FIGURE is a flowchart of a method of generating a transfer function in an exemplary embodiment of the invention.

DETAILED DESCRIPTION OF THE INVENTION

An exemplary embodiment of the invention provides a method within a DFSS process to develop semi-empirical transfer functions using numerical analysis and experimentation. The FIGURE presents a flow chart of the method in an exemplary embodiment of the invention in which a transfer function is generated to relate one or more KCPs, KNPs, or a combination thereof to a CTQ parameter. The goal is to generate a transfer function relating dimensionless groups to the CTQ parameter. Exemplary forms of the transfer function are $Y=F(N_1, N_2, \ldots N_n)$ or $N_y=F(N_1, N_2, \ldots N_n)$ where $N_a$ are dimensionless groups.

There are at least three ways to determine the dimensionless groups. A first technique is to select key parameters (i.e., KCPs and/or KNPs) that affect the CTQ parameter as shown at step 10. Identification of key parameters typically is based on a variety of sources such as reference text or prior experience. At step 12, dimensionless groups are determined based on the identified key parameters. The selected key parameters typically are formed into dimensionless groups using known techniques such as the Buckingham Pi routine. Alternatively, the dimensionless groups are selected directly based on knowledge of the problem as shown at step 14. For example, in fluids applications the Reynolds number is a known dimensionless group which may be selected at step 14.

A third alternative for selecting dimensionless groups is shown at step 16. If differential equations related to the application are known, dimensionless groups typically are extracted by reducing applicable differential equations to canonical form as shown at step 16. For step 16 to be executed, the differential equations relating the key parameters to the CTQ parameter need to be known. For certain applications, differential equations already exist which relate the key parameters to the CTQ parameter.

Once the dimensionless groups are obtained, using any of the above described methods, flow proceeds to step 18 where the functional transfer function is defined. The functional transfer function describes the form of the transfer equation, but not the necessarily the correlating values. For example, the functional transfer function may indicate a logarithmic relationship between a dimensionless group and a CTQ parameter. The correlating values are represented as variables to be determined at step 20.

The analytical transfer function is determined at step 20. Generation of the analytical transfer function typically is performed using regression analysis and design of experiments (DOE) to correlate the dimensionless groups to existing data and obtain the transfer function. At step 20, the functional transfer function defined at step 18 is fit to experimental data using regression analysis and DOE to define the correlating parameters which best fit the dimensionless groups to data such as analytical data or measured data.

The resulting transfer function requires relatively small DOE's, is compact and contains known physical parametric relationships through the use of dimensionless groups. The number of parameters in the transfer function will be reduced by using dimensionless groups. The resulting semi-empirical transfer function will extrapolate beyond the experimental data whereas the conventional polynomial empirical transfer functions should not be used outside the experimental data.

An exemplary application of the method of the FIGURE to generation of a transfer function for a heat transfer coefficient for flow in a pipe is described herein. As shown in step 10, the first step is to identify parameters that affect the heat transfer coefficient h. The result of this step is represented as $$h=F(v, d, L, p, , C_p, K).$$

The dimensionless groups are then identified as shown in step 12 by using the Buckingham Pi method or referencing a heat transfer text. The dimensionless group Nv, Nusselt number, is identified as follows:

$$N_v = \frac{hD}{k} = f(R_e, P_r) = f\left(\frac{VD\rho}{\mu}, \frac{Cp\mu}{k}\right) = CR_e^a P_r^b$$

Where a, b and c are correlating parameters and Re, Reynolds number, and Pr, Prandtl number, are dimensionless groups. Regression analysis and DOE are then used to correlate the dimensionless groups to existing data to determine values for the correlating parameters and generate a transfer function.

For comparison, the usual form of an empirical, polynomial transfer function is shown as:

$$h=C+aV+bV^2+d+e^2+f+g^2+\ldots$$

where a, b, c, d, e, . . . are correlating parameters. The semi-empirical transfer function produced in accordance with an exemplary embodiment of the invention is compact, contains known parameter relationships and usually has far less correlation coefficients than the conventional empirical transfer function.

The method of generating a semi-empirical transfer function, such as that shown in the FIGURE, may be implemented on a general purpose computer programmed to execute the method steps. The general purpose computer comprises a user interface (input device and display) to allow the user to provide input as necessary (e.g., identify KCPs and/or KNPs). The computer may also access other programs, such as the Buckingham Pi routine or the DOE routine, to facilitate execution of the method.

The present invention alternatively is embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for determining a transfer function relating a critical to quality parameter to key parameters in a design for six sigma process, the method comprising:

determining a dimensionless group containing a plurality of key parameters, said key parameters including one of key control parameters and key noise parameters, said key parameters having an affect on said critical to quality parameter; wherein determining a dimensionless group further includes obtaining differential equations related to said key parameters and reducing said differential equations to canonical form to extract said dimensionless group;

generating a transfer function relating said dimensionless group to said critical to quality parameter;

applying the transfer function in an analysis of a system design; and adjusting the system design in conformance with the analysis of the system design.

2. The method of claim 1 wherein:

the step of determining a dimensionless group includes obtaining a known dimensionless group related to said critical to quality parameter.

3. The method of claim 1 wherein the step of determining a dimensionless group includes:

selecting said key parameters; and forming said dimensionless group in response to said key parameters.

4. The method of claim 3 wherein:

the step of forming said dimensionless group includes using a Buckingham Pi process to obtain said dimensionless group.

5. The method of claim 1 wherein:

the step of generating a transfer function includes determining a functional transfer function defining a form for said transfer function, said functional transfer function including at least one correlating parameter.

6. The method of claim 5 wherein:

the step of generating a transfer function includes using regression analysis and design of experiments to generate a value for said correlating parameter.

7. A storage medium encoded with machine-readable computer program code for determining a transfer function relating a critical to quality parameter to key parameters in a design for six sigma process, the storage medium including instructions for causing a computer to implement a method comprising:

determining a dimensionless group containing a plurality of key parameters, said key parameters including one of key control parameters and key noise parameters, said key parameters having an affect on said critical to quality parameter; wherein determining a dimensionless group further includes obtaining differential equations related to said key parameters and reducing said differential equations to canonical form to extract said dimensionless group;

generating a transfer function relating said dimensionless group to said critical to quality parameter;

applying the transfer function in an analysis of a system design; and enhancing the system design in conformance with the analysis of the system design.

8. The storage medium of claim 7 wherein:

the step of determining a dimensionless group includes obtaining a known dimensionless group related to said critical to quality parameter.

9. The storage medium of claim 7 wherein the step of determining a dimensionless group includes:

selecting said key parameters; and forming said dimensionless group in response to said key parameters.

10. The storage medium of claim 9 wherein:

the step of forming said dimensionless group includes using a Buckingham Pi process to obtain said dimensionless group.

11. The storage medium of claim 7 wherein:

the step of generating a transfer function includes determining a functional transfer function defining a form for said transfer function, said functional transfer function including at least one correlating parameter.

12. The storage medium of claim 11 wherein:

the step of generating a transfer function includes using regression analysis and design of experiments to generate a value for said correlating parameter.

* * * * *